United States Patent
Tan et al.

(10) Patent No.: US 11,467,270 B2
(45) Date of Patent: Oct. 11, 2022

(54) APPARATUS AND METHOD FOR CALIBRATING OR TESTING AN IMAGING DEVICE

(71) Applicant: ASMPT SINGAPORE PTE. LTD., Singapore (SG)

(72) Inventors: Lian Hok Tan, Singapore (SG); Malliah Ramkumar, Singapore (SG); Hong Liang Lu, Singapore (SG); Jiangwen Deng, Hong Kong (HK); Hei Lam Chang, Hong Kong (HK)

(73) Assignee: ASMPT SINGAPORE PTE. LTD., Singapore (SG)

( * ) Notice: Subject to any disclaimer, the term of this patent is extended or adjusted under 35 U.S.C. 154(b) by 306 days.

(21) Appl. No.: 16/821,164

(22) Filed: Mar. 17, 2020

(65) Prior Publication Data
US 2020/0309927 A1    Oct. 1, 2020

Related U.S. Application Data

(60) Provisional application No. 62/824,375, filed on Mar. 27, 2019.

(51) Int. Cl.
*G02F 1/13*     (2006.01)
*G01S 7/497*    (2006.01)
*G01S 17/894*   (2020.01)
*G01S 7/481*    (2006.01)

(52) U.S. Cl.
CPC ......... *G01S 7/4972* (2013.01); *G01S 7/4815* (2013.01); *G01S 7/4816* (2013.01); *G01S 7/4818* (2013.01); *G01S 17/894* (2020.01)

(58) Field of Classification Search
CPC .... G01S 7/4972; G01S 7/4815; G01S 7/4816; G01S 7/4818; G01S 17/894
USPC ........................................ 356/4.01
See application file for complete search history.

(56) References Cited

U.S. PATENT DOCUMENTS

2016/0266048 A1* 9/2016 Liang ............... G01N 21/8806

\* cited by examiner

*Primary Examiner* — Nguyen T Truong
(74) *Attorney, Agent, or Firm* — Ostrolenk Faber LLP

(57) ABSTRACT

An imaging device testing system has a light receiver for receiving light from an imaging device under test, a light emitter for returning the light back to the imaging device under test, and first and second transceiver tables movable relative to each other. The first transceiver table has a first light redirecting module for receiving the light from the light receiver and the second transceiver table comprising a second light redirecting module for transmitting the light to the light emitter. The first and second light redirecting modules are positionable to simulate a distance travelled by the light from the light receiver, through the first and second light redirecting modules and a gap between the first and second light redirecting modules, to the light emitter.

20 Claims, 2 Drawing Sheets

APPARATUS AND METHOD FOR CALIBRATING OR TESTING AN IMAGING DEVICE

FIELD OF THE INVENTION

The present invention relates to an apparatus and method for calibrating or testing an imaging device, particularly a Time-of-Flight (ToF) 3D imaging device.

BACKGROUND

ToF based 3D imaging sensors are used to obtain depth information regarding a scene in addition to capturing an image. In other words, the real-world distances of different points on the image are obtained to form a three-dimensional profile of the image. This three-dimensional profile containing depth information is used in applications such as mobile phone face recognition, hand gesturing, security surveillance and depth determination in automatically driven vehicles.

ToF 3D imaging sensors typically use light emitters, such as VCSELs or LEDs, to emit light and receivers, such as CMOS cameras or light sensors with optical lenses, to receive the reflected light from the objects. This process involves the emitter emitting the light in specific phases by phase modulation. The returning reflected light from the subject would have phase differences according to its distance travelled (Time-of-Flight), and the sensor algorithm would calculate the phase differences and interpret these phase differences into different depth information.

Since the Time-of-Flight (ToF) 3D imaging sensors measure the distances travelled relating to the points of the image, these sensors need accurate calibration to minimize errors due to phase modulation.

FIG. 1 shows a conventional apparatus for estimating such periodic errors, sometimes known as Cyclic error or Wiggling error. During the test or calibration, a calibration object 202, such as a diffusive white chart with appropriate dimensions, is mounted on a stand at a known distance. Light emitted from a ToF 3D imaging device 201 is reflected back to the ToF 3D imaging device 201 by the calibration object 202, in order to measure a first known distance D1 of the calibration object 202. The first known distance D1 is obtained from the depth information of the calibration object 202. The phase difference between the light emitted from an emitter of the ToF 3D imaging device 201 and the light reflected from the calibration object 202 back to a receiver of the ToF 3D imaging device 201 is calculated as depth information of the calibration object 202. The calibration object 202 is then moved to a second known distance D2 and the ToF 3D imaging device 201 measures its depth information again. This procedure is repeated for the whole range of distances designed for the ToF 3D imaging device 201. Error estimates are then calculated by comparing the known distances with the distances measured by the ToF 3D imaging device 201, and these error estimates are used as calibration data to calibrate the ToF 3D imaging device 201.

Since this method of calibrating the ToF 3D imaging device 201 requires the calibration object 202 to be placed at different distances in order to simulate an object located at the respective distances, a huge calibration system and a large calibration object 202 is needed if the designed range of the ToF 3D imaging device 201 is long. However, in reality, such extremely large calibration systems would be impractical to construct due to the associated high construction and maintenance costs.

Furthermore, this method requires the calibration object 202 to be moved to different distances in order to obtain the error estimates for the whole range of distances designed for the ToF 3D imaging device 201. Thus, it might take a long time to complete one calibration cycle, making this calibration method time and cost inefficient, especially in high volume production environments.

SUMMARY OF THE INVENTION

It is thus an object of this invention to seek to provide a more time or cost efficient apparatus and method for calibrating or testing an imaging device.

Accordingly, the present invention provides an imaging device testing system comprising: a light receiver for receiving light from an imaging device under test; a light emitter for returning the light back to the imaging device under test; and a first transceiver table and a second transceiver table movable relative to each other, the first transceiver table comprising a first light redirecting module for receiving the light from the light receiver and the second transceiver table comprising a second light redirecting module for transmitting the light to the light emitter; wherein the first light redirecting module and the second light redirecting module are positionable to simulate a distance travelled by the light from the light receiver through the first and second light redirecting modules and a gap between the first and second light redirecting modules to the light emitter.

These and other features, aspects, and advantages will become better understood with regard to the description section, appended claims, and accompanying drawings.

BRIEF DESCRIPTION OF THE DRAWINGS

Embodiments of the present invention will now be described, by way of example only, with reference to the accompanying drawings, in which.

In the drawings, like parts are denoted by like reference numerals.

DETAILED DESCRIPTION OF THE PREFERRED EMBODIMENT OF THE INVENTION

Figure 1:
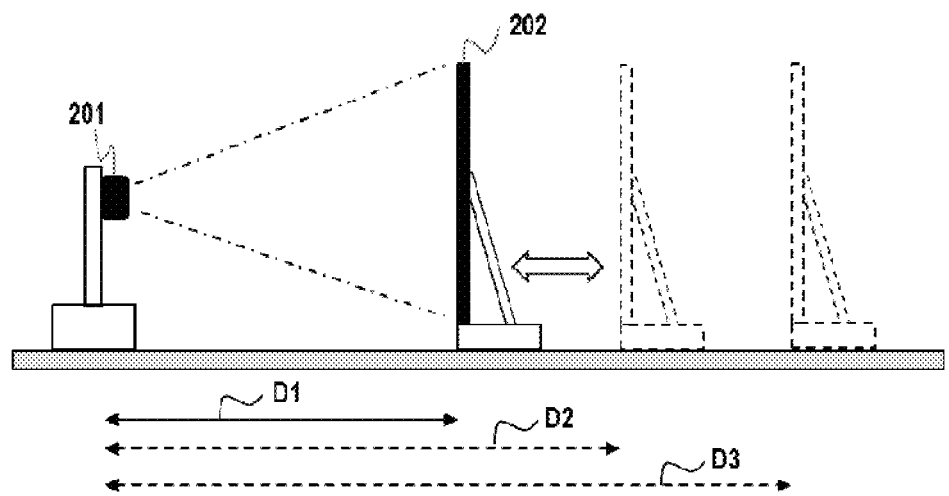
FIG. 1 shows a conventional apparatus for estimating the errors in a ToF 3D imaging device.
Figure 2:
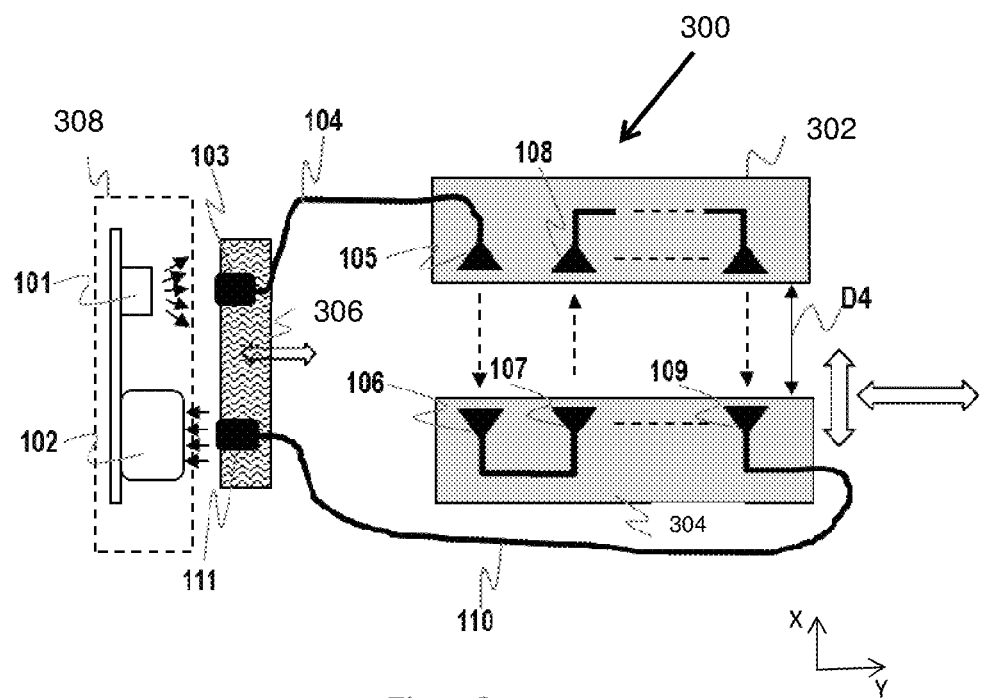
FIG. 2 illustrates an imaging device calibration or error measurement system according to a first embodiment of the present invention.

FIG. 2 illustrates an imaging device calibration or error measurement system 300 according to a first embodiment of the present invention. The error measurement system 300 includes a coupling block 306, a first transceiver table 302 and a second transceiver table 304 operatively coupled to one another.

The coupling block 306 comprises a light receiver 103 and a light emitter 111 that are mounted on it. The light receiver 103 is configured for receiving light from an imaging device under test and is connected to a first table emitter 105 of the first transceiver table 302 via a light transmitting link, which may be a fiber link 104. The first transceiver table 302 further comprises a first light redirecting module, such as a first series of fiber-coupling assemblies 108, that is operatively coupled to a second light redirecting module, such a second series of fiber-coupling assemblies 107 comprised in the second transceiver table 304. Each fiber-coupling assembly may comprise a table light receiver connected to a table light emitter. A return table light receiver 109 comprised in the second transceiver table 304 is connected to a light emitter 111 of the coupling block 306 via another light transmitting link, which may be a return fiber link 110.

An imaging device under test, which may be in the form of a ToF 3D imaging device 308, comprises an emitter 101, which may emit light at any predetermined phase and frequency, and a receiver 102. The emitter 101 emits light that is received by the light receiver 103 of the coupling block 306 and transmitted to the first transceiver table 302 via the fiber link 104. The first series of fiber-coupling assemblies 108 are positioned opposite the second series of fiber-coupling assemblies 107. Advantageously, the first series of fiber-coupling assemblies 108 are arrange parallel to the second series of fiber-coupling assemblies 107 to ensure a consistent separation distance therebetween.

Hence, the first table light emitter 105 transmits the light to a table light receiver 106 of the second series of fiber-coupling assemblies 107 comprised in the second transceiver table 304. The table light receiver 106 is part of a first fiber-coupling assembly of the second transceiver table 304, wherein each fiber-coupling assembly 107, 108 may comprise a respective table light receiver that is coupled to a corresponding table light receiver and installed in the light redirecting module. The first fiber-coupling assembly of the second transceiver table 304 transmits the light via the table light emitter to a first fiber-coupling assembly of the first transceiver table 302 (comprising another table light receiver coupled to another table light emitter, linked such as by a transmitting link or fiber link), which then transmits the light back to a second fiber-coupling assembly of the second transceiver table 304.

The light is repeatedly transmitted back and forth along an optical path between the first series of fiber-coupling assemblies 108 of the first transceiver table 302 and the second series of fiber-coupling assemblies 107 of the second transceiver table 304 at different points along the fiber-coupling assemblies 107, 108 until the return table light receiver 109 comprised in the second transceiver table 304 receives the light. In this way a plurality of fiber-coupling assemblies in both the first transceiver table 302 and the second transceiver table 304 forms an optical path which includes repeated transmissions across an air separation gap D4 between the tables 302, 304.

It should be appreciated that in the above set-up, a table light emitter of a light redirecting module on a transceiver table 302, 304 emits light at a first point to be received by the other transceiver table, and a table light receiver at a second point spaced from the first point would receive light transmitted back from the other transceiver table. Such spaced arrangement facilitates the simulation of a travel distance of the light path.

The separation gap D4 between the first transceiver table 302 and the second transceiver table 304 may be changed by moving either one or both tables 302, 304 by way of a positioning mechanism coupled to at least one of the first and second transceiver tables 302, 304. Such movement is operative to change a size of the separation gap D4. In addition, these fiber-coupling assemblies can be placed in either a two-dimensional (as illustrated in the FIG. 2) or in a three-dimensional arrangement. In the latter arrangement, the plurality of table light emitters and table light receivers would be arranged two-dimensionally (instead of one-dimensionally) on a planar surface of each transceiver table 302, 304 facing the other transceiver table. Subsequently, the light travels from the return table light receiver 109 to the light emitter 111 of the coupling block 306 via the return fiber link 110. Finally, the light from the light emitter 111 is returned to the ToF 3D imaging device 308 and is received by the receiver 102 of the ToF 3D imaging device 308 positioned adjacent the light emitter 111. In this manner, a specific travel distance for the light rays may be achieved using a combination of the fiber links 104, 110 and the fiber-coupling assemblies 107, 108 in the two tables 302, 304 and the separation gap D4 to simulate the Time-of-Flight across a real-world operational distance designed for the ToF 3D imaging device 308. A 3D sensor algorithm incorporated therein would calculate or determine the depth information based on the Time-of-Flight.

As the light is transmitted through a path of fiber-couplings, the total distance travelled by the light may be varied by adjusting the separation gap D4 between the first transceiver table 302 and the second transceiver table 304 through an adjustment of the positions of either one or both of the tables 302, 304 via the positioning mechanism. The larger the separation gap D4 between the first transceiver table 302 and the second transceiver table 304, the longer the distance travelled by the light (Time-of-Flight) and vice versa. Thus, by changing the relative positions of the first transceiver table 302 and the second transceiver table 304, the ToF 3D imaging device 308 may in practice be calibrated over the whole range of distances designed for the ToF 3D imaging device 308, without the need for a huge calibration system and a large calibration object.

Apart from adjusting the separation gap D4 (along an X-axis) between the first transceiver table 302 and the second transceiver table 304, both the tables 302, 304 may be moved via the positioning mechanism in directions perpendicular to the separation gap D4 (along a Y-axis) to provide an additional degree of freedom to vary the light travel distance and path. Utilizing such feature, a table light emitter of one transceiver table 302, 304 may be moved from alignment with a first table light receiver of the other transceiver table into alignment with a second table light receiver of the other transceiver table so as to change an optical path of the light and to vary a length of the optical path. For instance, when the fiber-coupling assemblies are arranged in a three-dimensional configuration, the distance travelled by the light may be further adjusted by moving the tables 302, 304 in a Z-axis (perpendicular to both the X-axis and Y-axis) as well.

It should be appreciated that the one-dimensional light travel path utilized by the conventional calibration method has now been modified into a two-dimensional XY, or a three-dimensional XYZ travel path. Thus, it is possible to dramatically reduce the total size of the whole test system into a more compact module. The distances required for calibration may be achieved by adjusting the relative positions of the first transceiver table 302 and the second transceiver table 304 along the XYZ axes. For instance, if the first transceiver table 302 or the second transceiver table 304 is moved in the X-axis, such that the separation gap D4 between the first series of fiber-coupling assemblies 108 and the second series of fiber-coupling assemblies 107 is changed, the light path distance would be varied. The first transceiver table 302 or the second transceiver table 304 may also be moved in the Y axis or Z axis, in which case, the light path distance would be varied without changing the separation gap D4.

The coupling of the first series of fiber-coupling assemblies 108 of the first transceiver table 302 to the second series of fiber-coupling assemblies 107 of the second transceiver table 304 forms a fiber-coupling arrangement with a capability of achieving different light path distances. The actual light path distance may be varied depending on the separation gap D4 between the first series of fiber-coupling assemblies 108 and the second series of fiber-coupling assemblies 107.

It is common that different 3D sensors have different fields of view depending on their designs and applications. To cater for this, a translation mechanism is coupled to the coupling block 306 which houses the light receiver 103 and the light emitter 111, so that the coupling block 306 can be moved closer to or farther away from the ToF 3D imaging device 308 being calibrated or tested, in order to cater to different fields of view of different types of 3D sensors.

The fiber-coupling arrangement may thus be made substantially smaller than the space needed by the conventional calibration method. Moreover, since the distances moved by the first transceiver table 302 and/or the second transceiver table 304 are significantly smaller than the distances moved by the calibration object 202 of the conventional calibration method, the overall test or calibration time would be much shorter as compared to the conventional test or calibration method.

Figure 3:
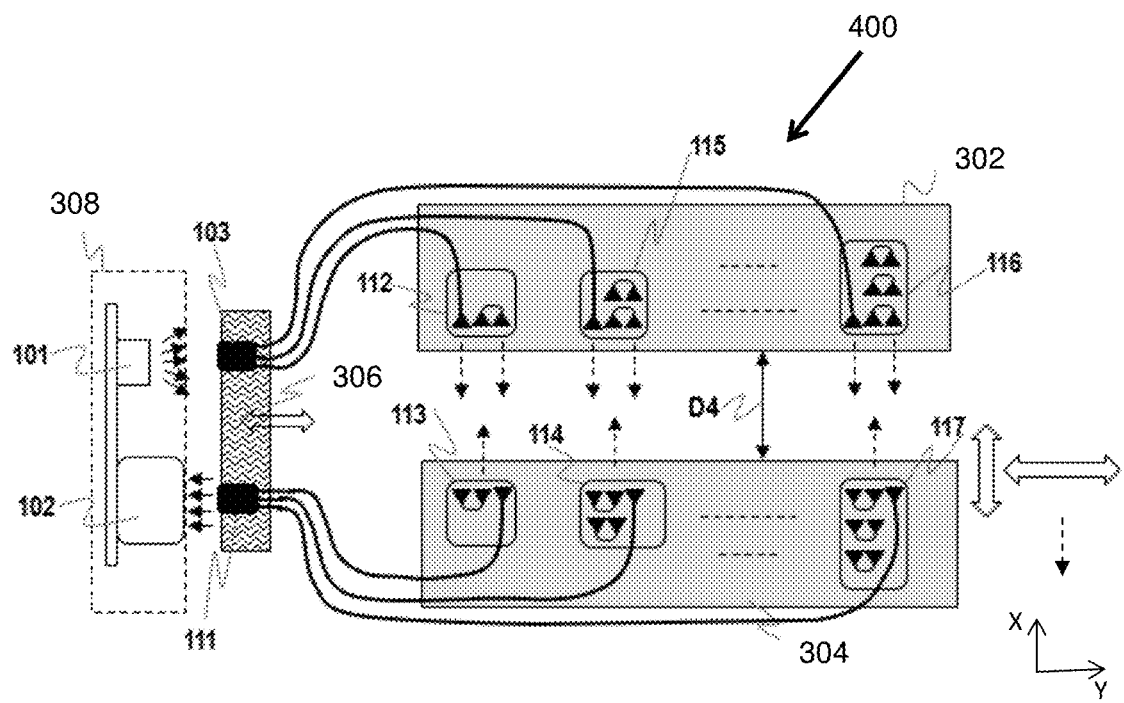
FIG. 3 illustrates an imaging device calibration or error measurement system according to a second embodiment of the present invention.

FIG. 3 illustrates an imaging device calibration or error measurement system 400 according to a second embodiment of the present invention. Similar elements are given similar reference numerals. The error measurement system 400 includes a coupling block 306, a first transceiver table 302 and a second transceiver table 304 operatively coupled to one another.

The first transceiver table 302 comprises a plurality of fiber-coupling sub-modules 112, 115, 116, and the second transceiver table 304 comprises a plurality of fiber-coupling sub-modules 113, 114, 117. Each light redirecting modules or fiber-coupling sub-module may have a separate light redirecting module or fiber-coupling assembly. By the deliberate juxtaposition of fiber-coupling sub-modules, each with its own separate light redirecting module or fiber-coupling assembly, the error measurement system 400 would be able to simulate multiple light path distances that may be measured concurrently. For instance, each fiber-coupling sub-module 112, 115, 116 from the first transceiver table 302 may be paired with a respective fiber-coupling sub-module 113, 114, 117 from the second transceiver table 304 to simulate a particular light path distance. Hence, every pair of fiber-coupling sub-modules forms a fiber-coupling arrangement that simulates a different light path distance, and all these different light path distances may be measured at the same time and changed simultaneously simply by varying the relative positions of the first transceiver table 302 and the second transceiver table 304. For example, by moving the first transceiver table 302 or the second transceiver table 304 along the X-axis, a separation gap D4 between the first transceiver table 302 and the second transceiver table 304 would be varied, and the all different light path distances may be altered and measured at the same time. Similarly, the first transceiver table 302 or the second transceiver table 304 may be moved in the Y-axis or Z axis to vary all the light path distances simultaneously, in which case, the separation gap D4 would remain unchanged. Hence, many different fiber-coupling arrangements may be combined and connected between the light receiver 103 and the light emitter 111 of the coupling block 306 such that several different light path distances may be measured concurrently, leading to further reductions in calibration time.

A light receiver 103 and a light emitter 111 are mounted on the coupling block 306, which may be moved nearer to or farther away from an emitter 101 and a receiver 102 of a ToF 3D imaging device 308. This allows the error measurement system 400 to be fine-tuned to cater to different 3D sensors with different fields of view due to different applications or design requirements.

The error measurement system 400 allows the ToF 3D imaging device 308 to be calibrated more quickly and efficiently.

Figure 4:
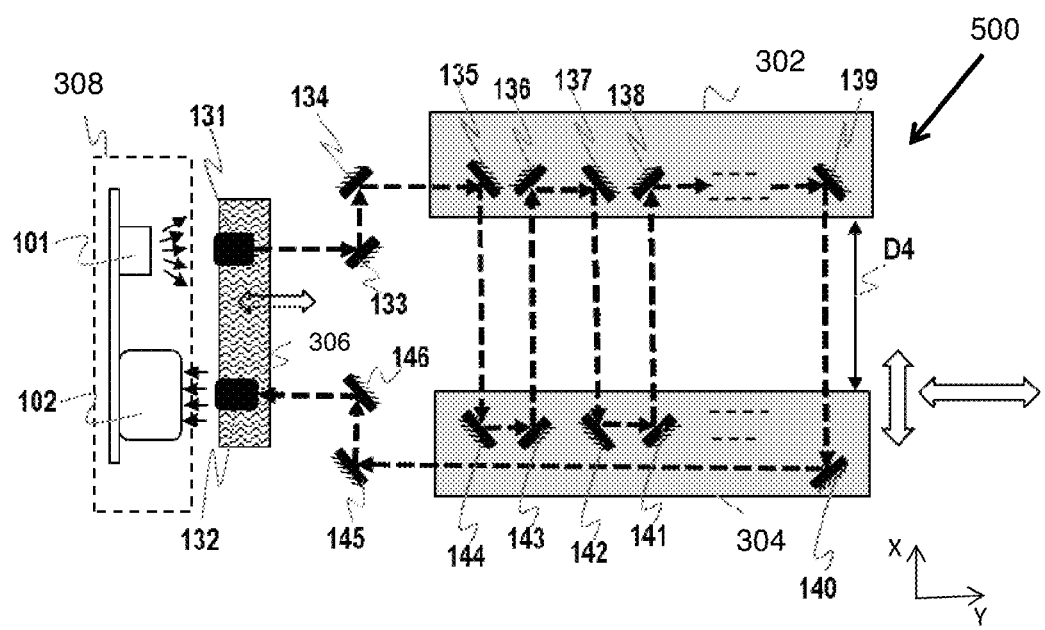
FIG. 4 illustrates an imaging device calibration or error measurement system according to a third embodiment of the present invention.

FIG. 4 illustrates an imaging device calibration or error measurement system 500 according to a third embodiment of the present invention. Similar elements are given similar reference numerals. The error measurement system 500 includes a coupling block 306, a first transceiver table 302 and a second transceiver table 304 operatively coupled to one another.

Instead of using fiber links and fiber-coupling assemblies as light redirecting modules, reflective elements, such as mirrors or prisms, may be used to create a light path for the light from an emitter 101 of a ToF 3D imaging device 308 to travel through the error measurement system 500 and back to a receiver 102 of the ToF 3D imaging device 308 in order to calibrate the ToF 3D imaging device 308.

A first set of light redirecting modules or reflective elements 133, 134 may be used to direct the light from a light receiver 131 of a coupling block 306 to the first transceiver table 302, and a second set of light redirecting modules or reflective elements 145, 146 may be used to direct the light from the second transceiver table 304 to a light emitter 132 of the coupling block 306.

The first transceiver table 302 comprises a first series of light redirecting modules or reflective elements 135, 136, 137, 138, 139 operatively coupled with a second series of light redirecting modules or reflective elements 140, 141, 142, 143, 144 comprised in the second transceiver table 304. The first series of reflective elements 135, 136, 137, 138, 139 and the second series of reflective elements 140, 141, 142, 143, 144 are positioned to form a light path through the tables 302, 304 and a separation gap D4 between the tables 302, 304. The light is transmitted back and forth between the first series of reflective elements 135, 136, 137, 138, 139 of the first transceiver table 302 and the second series of reflective elements 140, 141, 142, 143, 144 of the second transceiver table 304. In this way a plurality of reflective elements in both the first transceiver table 302 and the second transceiver table 304 forms an optical path which includes repeated transmissions across an air separation gap D4.

The separation gap D4 between the first transceiver table 302 and the second transceiver table 304 may be changed by moving either one or both tables 302, 304. In addition, these reflective elements can be placed in either a two-dimensional (as illustrated in the FIG. 2) or in a three-dimensional arrangement. Subsequently, the light travels from the last reflective element 140 in the second transceiver table 304 to the light emitter 132 of the coupling block 306 via the second set of reflective elements 145, 146. Finally, the light from the light emitter 111 is received by the receiver 102 of the ToF 3D imaging device 308 positioned adjacent the light emitter 111. In this manner, a specific distance for the light rays may be achieved using the reflective elements in the two tables 302, 304 to simulate the Time-of-Flight across a real-world operational distance designed for the ToF 3D imaging device 308. A 3D sensor algorithm incorporated therein would calculate or determine the depth information based on the Time-of-Flight.

The calibration system 300, 400, 500 allows the light path distance to be programmable. One advantage of this invention is to dramatically reduce of the size of the system as compared to a conventional test system. If the designed measurement distance is a few meters or more, the size of the conventional test system would correspondingly need to be several meters long. The calibration system 300, 400, 500 would be much smaller than the conventional system, due to the two-dimensional or three-dimensional arrangements of its fiber-coupling assemblies and/or reflective elements.

Since the size of the calibration system 300, 400, 500 is relatively smaller, it would be cheaper to manufacture and maintain. Moreover, the floor space required would be substantially smaller, which would be an important consideration if the calibration system 300, 400, 500 is to be used in a clean room environment.

Furthermore, it is possible to have a mixture of reflective elements and fiber-coupling assemblies in the calibration system 300, 400, 500.

The range of simulated distances may be increased exponentially because the calibration system 300, 400, 500 allows the number of fiber-coupling assemblies and/or reflective elements being utilized and the relative positions of the tables 302, 304 along the XYZ axes to be varied.

It is also possible to further increase the range of simulated distances by introducing optical tap points in between the series of fiber-coupling assemblies.

In addition, due to the much shorter table travel distance required to vary the light path distance, the test cycle time is considerably reduced, resulting in higher production capacity.

The system is flexible to serve different 3D sensor types with different fields of view by finely adjusting the coupling block 306. In this manner, the calibration system 300, 400, 500 may be used for calibrating a wider variety of 3D sensor applications.

Although the present invention has been described in considerable detail with reference to certain embodiments, other embodiments are possible. Therefore, the spirit and scope of the appended claims should not be limited to the description of the embodiments contained herein.

The invention claimed is:

1. An imaging device testing system comprising:
    a light receiver for receiving light from an imaging device under test;
    a light emitter for returning the light back to the imaging device under test; and
    a first transceiver table and a second transceiver table movable relative to each other, the first transceiver table comprising a first light redirecting module for receiving the light from the light receiver and the second transceiver table comprising a second light redirecting module for transmitting the light to the light emitter;
    wherein the first light redirecting module and the second light redirecting module are positionable to simulate a distance travelled by the light from the light receiver through the first and second light redirecting modules and a gap between the first and second light redirecting modules to the light emitter.

2. The imaging device testing system as claimed in claim 1, further comprising a coupling block on which the light receiver and the light emitter are mounted, the coupling block being operatively connected respectively to the first and second transceiver tables.

3. The imaging device testing system as claimed in claim 2, further comprising a first light transmitting link connecting the light receiver on the coupling block to the first transceiver table, and a second light transmitting link connecting the light emitter on the coupling block to the second transceiver table.

4. The imaging device testing system as claimed in claim 3, wherein the first and second light transmitting links comprise fiber links.

5. The imaging device testing system as claimed in claim 2, further comprising a translation mechanism coupled to the coupling block to move the coupling block in directions towards or away from the imaging device under test.

6. The imaging device testing system as claimed in claim 1, wherein each light redirecting module comprises a series of fiber-coupling assemblies, each fiber-coupling assembly further comprising a respective table light receiver that is coupled to a corresponding table light emitter installed in the each light redirecting module.

7. The imaging device testing system as claimed in claim 1, wherein the first light redirecting module is arranged parallel to the second light redirecting module to transmit light to the second light redirecting module across the gap between the first and second light redirecting modules.

8. The imaging device testing system as claimed in claim 7, wherein each light redirecting module comprises both a table light emitter at a first point to emit light to be received by the other light redirecting module and a table light receiver to receive light transmitted back from the other light redirecting module at a second point spaced from the first point.

9. The imaging device testing system as claimed in claim 8, wherein a plurality of table light emitters and table light receivers is arranged two-dimensionally on a planar surface of each transceiver table facing the other transceiver table.

10. The imaging device testing system as claimed in claim 7, wherein an optical path between the first and second transceiver tables comprises light that is repeatedly transmitted back and forth between the first and second light redirecting modules at different points along the first and second light-redirecting modules.

11. The imaging device testing system as claimed in claim 10, wherein the first or second light redirecting module comprises a return table light receiver, which is connected to the light emitter to transmit light to the light emitter for returning the light back to the imaging device under test.

12. The imaging device testing system as claimed in claim 1, further comprising a positioning mechanism coupled to at least one of the first and second transceiver tables for moving at least one of the first and second transceiver tables relative to the other.

13. The imaging device testing system as claimed in claim 12, wherein the positioning mechanism is operative to change a size of the gap between the first and second light redirecting modules.

14. The imaging device testing system as claimed in claim 13, wherein the positioning mechanism is further configured for moving the at least one transceiver table in directions perpendicular to the gap between the first and second light redirecting modules.

15. The imaging device testing system as claimed in claim 14, wherein moving the transceiver table in directions perpendicular to the gap is operative to move a table light emitter of the first transceiver table from alignment with a first table light receiver into alignment with a second table light receiver of the second transceiver table, whereby to change an optical path of the light.

16. The imaging device testing system as claimed in claim 1, wherein an optical path travelled by the light emitted and received by the imaging device under test passes through a combination of the light receiver, the first light redirecting module, the gap, the second light redirecting module and the light emitter.

17. The imaging device testing system as claimed in claim 16, wherein a length of the optical path is configured to be substantially equivalent to a real-world operational distance designed for the imaging device under test.

18. The imaging device testing system as claimed in claim 1, wherein the first and second light redirecting modules comprise a plurality of reflective elements for redirecting light between the first and second transceiver tables.

19. The imaging device testing system as claimed in claim 18, wherein the reflective elements comprise mirrors or prisms.

20. The imaging device testing system as claimed in claim 1, wherein the gap comprises an air gap.

\* \* \* \* \*